United States Patent

Marwah et al.

Patent Number: 5,851,349
Date of Patent: Dec. 22, 1998

[54] MAGNETIC DEINKING OF WASTE PAPERS

[75] Inventors: Nipun Marwah, Mt. Pleasant; G. Frederick Hutter, Charleston, both of S.C.

[73] Assignee: Westvaco Corporation, New York, N.Y.

[21] Appl. No.: 922,883

[22] Filed: Sep. 3, 1997

Related U.S. Application Data

[60] Division of Ser. No. 618,500, Mar. 19, 1996, which is a continuation-in-part of Ser. No. 447,240, May 22, 1995, Pat. No. 5,639,346, which is a continuation-in-part of Ser. No. 238,478, May 5, 1994, Pat. No. 5,527,426, which is a continuation-in-part of Ser. No. 183,746, Jan. 21, 1994, abandoned.

[51] Int. Cl.⁶ ...................................................... D21C 5/02
[52] U.S. Cl. .................................................. 162/5; 162/55
[58] Field of Search ....................... 162/4, 5, 55; 209/39, 209/221, 224; 210/695

[56] References Cited

U.S. PATENT DOCUMENTS 4,820,379   4/1989   Darlington .................................. 162/5
5,224,604   7/1993   Duczmal et al. .

*Primary Examiner*—Brenda A. Lamb
*Attorney, Agent, or Firm*—Terry B. McDaniel; Daniel B. Reece, IV; Richard L. Schmalz

[57] ABSTRACT

An improved process is disclosed for deinking waste paper which contains nonimpact printed papers printed with xerographic and laser inks by repulping the waste paper to form a slurry in the presence of an agglomeration agent and magnetite and subjecting the slurry to a magnetic field to remove the agglomerated ink particles, whereby the improvement comprises replacement of a portion of the agglomeration agent with a copolymer of styrene and acrylic monomers which copolymer is further characterized by having a Ring and Ball softening point of 70°–105° C. and an number average molecular weight of 2,000 to 10,000. The magnetic treatment preferably is conducted at ambient or greater temperature, at neutral to alkaline pH, and at a low pulp consistency. Also, the process may be employed as an additional step in a conventional process for removing inks from reprographic printed papers, such as ink removal by screening, flotation, centrifugal cleaning, washing, and sedimentation with or without decantation.

9 Claims, 2 Drawing Sheets

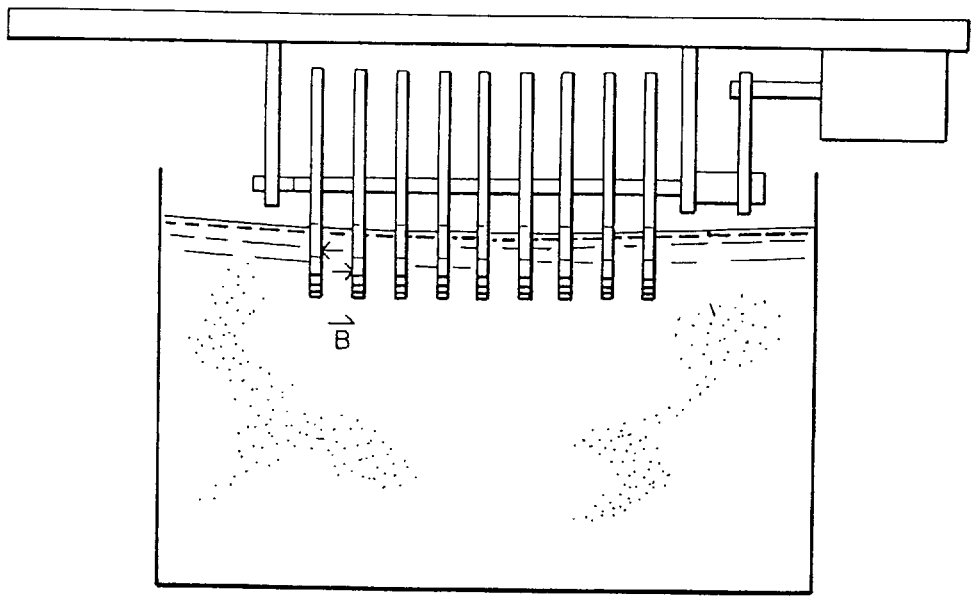
FIG. 3
FIG. 4
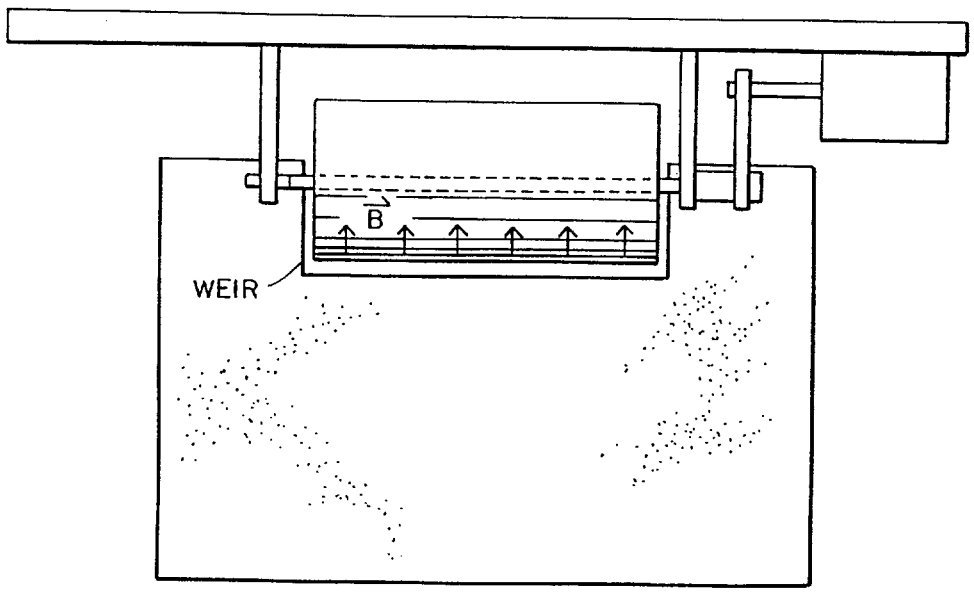

MAGNETIC DEINKING OF WASTE PAPERS

This is a divisional application of continuation-in-part application Ser. No. 08/618,500, filed Mar. 19, 1996, which is a continuation-in-part of application Ser. No. 08/447,240, filed May 22, 1995 and issued as U.S. Pat. No. 5,639,346 on Jun. 17, 1997, which is a continuation-in-part application of Ser. No. 08/238,478, filed on May 5, 1994 and issued as U.S. Pat. No. 5,527,426 on Jun. 18, 1996, which is a continuation-in-part application of Ser. No. 08/183,746, filed on Jan. 21, 1994 and now abandoned.

BACKGROUND OF THE INVENTION

1. Field of the Invention.

The present invention relates to a method of deinking waste paper (secondary fiber). More particularly, this invention relates to deinking secondary fibers contaminated with non-magnetic inks by sequentially subjecting a slurry of the fibers to (1) magnetite and an agglomerant, and (2) a magnetic field.

2. Description of the Prior Art.

Waste paper, also known as secondary fiber, has long served as a source of raw fiber material in papermaking. Waste paper materials invariably contain one or more contaminants including inks, dye colors, fluorescent whitening agents, and "stickies" (sticky or tacky contaminants including adhesives, binders, plastic films, coatings, and the like). Sorted waste paper has had most of these contaminated papers removed and represents a higher, more expensive grade of waste paper. The growing utilization of secondary fibers in many types of paper products has made it necessary for paper manufacturers to process lower grades of waste paper (i.e., unsorted waste paper). While various methods have been employed to remove the contaminants to permit incorporation of the secondary fibers with virgin pulp in papermaking, such lower grade furnish is more heterogeneous and typically contains significantly more contaminants than a higher quality waste paper. Conventional treatment methods may not be adequate to permit incorporation of a significant percentage of unsorted waste papers.

Current approaches to processing recycled fibers can be classified as repulping (slushing of fibers and partial detachment of ink/contaminants from fibers), coarse and fine screening (separation of fibers from contaminants by size and shape), centrifugal cleaning (separation based on density differences relative to fibers and reduction in size of ink/contaminants by mechanical action), flotation (separation by preferential adsorption of detached ink/contaminants onto air bubbles), washing (separation of small entrained particles from fibers by relative flow of water passing by fibers) and refining. There is an optimum particle size range for separation of particles from fibers in each of these processes. Depending upon the specific cleanliness requirements for the deinked pulp, it takes a combination of most or all of these processes to cover the size range of particles that one typically encounters. Both the washing and flotation processes depend on the proper use of surfactant. Depending on the relative strength and size of the hydrophillic versus hydrophobic portion of the surfactant molecule, the surfactant will cluster around ink and other contaminant particles, rendering the particles hydrophilic for washing purposes or more hydrophobic for flotation. The opposing natures of washing surfactant and flotation surfactant can cause problems in combination flotation/washing systems.

Certain specific removal approaches have been disclosed for specific waste paper contaminants:

U.S. Pat. No. 5,211,809 discloses removing color from dyes from secondary pulps with non-chlorine based bleaching agents in treating sequences using oxygen with combinations of peroxide, ozone, and/or hydro sulfite at controlled pH conditions (less than 8 or greater than 10).

U.S. Pat. No. 5,213,661 teaches using oxygen to reduce the tackiness of stickies in secondary pulps and, optionally, using oxygen with alkali and/or detackifying agents for optimum stickies control. U.S. Pat. No. 5,080,759 teaches introducing a water-soluble organotitanium compound into the water system of a papermaking process containing the secondary fiber to reduce the tackiness and adhesive properties of the stickies contaminants.

Also, published Japanese Patent Application No. HEI 3[1991]-199477 teaches a method of recycling used paper containing either fluorescent white paper or colored paper or both by introducing ozone into a dispersed slurry of said used paper.

The effectiveness of ink removal strategies usually is determined by a combination of TAPPI dirt counts (to quantify larger specks), brightness readings, and image analysis. Image analysis involves the imaging of the surface of a handsheet or piece of paper, followed by digitization of this image by a computer. The resolution is set by specifying the minimum number of pixels that a particle must cover to be represented accurately. The output from the analysis is the total area of ink particles above a resolvable size on the surface of the paper sample. The limit of visibility for particles is about 40 micrometers. The standard limit for writing printing grades is less than 5 ppm.

While waste paper contaminants such as dyes, whiteners, and stickies present real problems in recycling, the most common removal problem is with inks. Printing inks have been classified broadly as impact and nonimpact inks.

Impact inks are used in conventional printing processes such as letterpress, flexography, and lithography. These inks are pressed or laid onto the paper but do not fuse with it. They generally consist of a pigment suspended in an oil-based or alkaline aqueous medium. The paper industry has been successfully deinking papers containing impact inks for years using washing and/or flotation type systems.

Also, U.S. Pat. No. 4,381,969 teaches bleaching waste paper containing encapsulated constituents such as inks by repulping the waste paper in the presence of an aqueous alkaline solution which contains a peroxide compound such as hydrogen peroxide.

Other patents disclosing deinking methods include:

U.S. Pat. No. 4,013,505, "Method of Deinking Printed Wastepapers";

U.S. Pat. No. 4,076,578, "Ink Removal From Waste Paper";

U.S. Pat. No. 4,147,616, "Apparatus for Deinking Printed Wastepaper";

U.S. Pat. No. 4,780,179, "Method for Producing Pulp from Printed Unselected Waste Paper";

U.S. Pat. No. 5,151,155, "Process for Deinking Wastepaper with Organically Modified Smectite Clay";

U.S. Pat. No. 5,221,433, "Deinking Wastepaper Using Alkoxylation Product of Carboxylic Acid Containing an OH Group and Alkylene Oxide";

U.S. Pat. No. 5,225,046, "Wastepaper Deinking Process";

U.S. Pat. No. 5,227,019, "Wastepaper Deinking Process";

U.S. Pat. No. 5,228,953, "Deinking Waste Paper Using a Polyglycol and a Phosphoric Ester Mixture"; and U.S. Pat. No. 5,238,538, "Method for Deinking Recycled Fiber by Applying Direct Current Electric Field."

Increasing amounts of secondary fiber, however, are generated from papers subjected to reprographic printing processes such as electro-photographic copying (e.g., xerography) and laser printing. These printing methods employ nonimpact inks. Nonimpact inks are comprised of a pigment and a thermoplastic resin. The resin is a bonding agent which fuses the pigment to the sheet and to other pigment particles. The pigments employed in nonimpact inks can be categorized as either iron-based or non-iron based (e.g., carbon based). The resin polymers become cross-inked and resistant to chemical and mechanical action, making nonimpact printed papers difficult to deink by conventional deinking processes. Once detached from the fibers the toner ink particles tend toward a size which is larger than that which can be efficiently handled by flotation or washing and too small to be removed by cleaners and screens. Various approaches have been disclosed specifically to remove reprographic type inks:

U.S. Pat. No. 4,561,933, "Xerographics Deinking";

U.S. Pat. No. 5,141,598, "Process and Composition for Deinking Dry Toner Electrostatic Printed Wastepaper"; and U.S. Pat. No. 5,217,573, "Removal of Laser Printer and Xerographic Ink from Recycle Paper."

Conventional deinking processes require high energy input and employ additives or solvents to assist the removal of reprographic type inks. Significant fiber loss results along with the ink removal. To economically employ this class of papers for recycling to higher grade, bright papers, a method is needed which removes the inks while retaining the fiber. Unfortunately, known ink removal processes, when employed to remove nonimpact inks, have the following common disadvantages:

high fiber loss (20–25%)

high solid waste high capital costs (due to large equipment requirement)

low ink removal efficiency

One method which overcomes these disadvantages is provided in commonly owned co-pending application Ser. No. 08/183,746 which teaches the employment of a magnetic field to selectively remove the magnetic (i.e., iron based) inks. Inks not affected by (or responsive to) a magnetic field (i.e., non-iron based, such as carbon pigments), however, will not be removed effectively by the use of a magnetic field and will be left behind with the secondary fibers. Likewise, other contaminants not susceptible to a magnetic field, such as stickies, are not attracted to a magnet for removal from a slurry of repulped secondary fibers.

A method to enhance magnetic deinking in furnishes containing a significant portion of non-iron based inks as well as iron based inks is disclosed in commonly owned co-pending application Ser. No. 08/238,478. The application teaches an improved magnetic deinking method for removal of a mixture of non-magnetic inks and magnetic inks, as well as additional non-magnetic contaminants, such as stickies, from repulped secondary fiber slurries.

Thus, an object of this application is to provide a magnetic deinking process for application to waste paper furnishes containing as much as 100% non-magnetic inks.

SUMMARY OF THE INVENTION

The above stated object of the invention is achieved by repulping waste paper which contains reprographic printed papers printed with inks which may or may not be magnetic, and possibly containing other non-magnetic contaminants, such as stickies, adding to the pulp slurry magnetite, an agglomerant, and a polymer or copolymer prepared from styrenic and/or acrylic monomers, said copolymer having a Ring and Ball softening point in the range of 60°–105° C., preferably 70°–95° C., and a weight average molecular weight of 1,000 to 10,000, preferably 2,000 to 8,000 (such as styrene/hydroxyethyl methacrylate (SHEMA)), and subjecting the treated pulped waste paper at low pulp consistency to a magnetic field to remove the inks therefrom. Preferably, after magnetite, SHEMA, and agglomerant addition, caustic is added to the pulp slurry prior to application of the magnetic field. More preferably, the magnetic treatment is conducted at ambient or higher temperatures, at pulp consistencies up to about 4%, and at neutral to alkaline pH. The magnetite/agglomerant/SHEMA/caustic/magnetic field treatment of the repulped waste paper can be used alone or as an additional step in a conventional process for removing inks from reprographic printed papers, such as ink removal by screening, flotation, centrifugal cleaning, washing, and sedimentation and/or decantation.

BRIEF DESCRIPTION OF THE DRAWINGS

FIG. 3 is a cross-section depiction of the application of a magnetic field in a tank containing waste paper pulp slurry via a magnetic disk (in series) filter partially submerged in said tank.

FIG. 4 is a cross-section depiction of the application of a magnetic field in a tank containing waste paper pulp slurry via a magnetic rotating drum situated in a weir within said tank.

DESCRIPTION OF THE PREFERRED EMBODIMENT(S)

Figure 1:
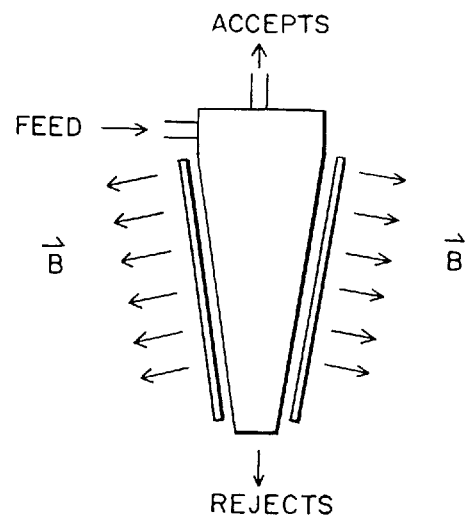
FIG. 1 is a cross-section depiction of the application of a magnetic field externally to a forward cleaner in a paper pulp manufacturing process.

As reported in co-pending application Ser. No. 08/183, 746, magnetic treatment was found to be very effective in removing toner inks and, in particular, the visible particles (>60 $\mu$m diameter). In the pulp and paper industry, pulp consistency (in water) is described generally as high (>15%), medium (7–15%), or low (<7%). Obviously, at medium and high consistency ink particle pathways toward a magnetic field may be hindered. Therefore, the invention method may be beneficially employed usually at low consistency. Also, the process achieves beneficial results under acid conditions above a pH of 4, although it is preferably employed at a neutral to alkaline pH. The preferred conditions for the magnetic treatment of the repulped mixed office waste is at from about 25° to about 65° C., at a pH of front about 7.0 to about 11.0 and at a pulp slurry consistency of from about 0.3 to 2.0%.

As magnetic separation is a physical rather than a chemical process and only particulate material is susceptible thereto, efficient magnetic ink removal should involve a pretreatment to separate any fused or bound inks from the repulped fibers, such as adsorption, coagulation/flocculation, and/or precipitation. Also, the particles to be magnetically separated must be attracted to the magnetic field of the magnet. Since many nonimpact inks are carbon-based rather than iron-based, in order to achieve acceptable (i.e., highly efficient) ink removal by magnetic separation, this improved deinking process involves addition of a magnetic carrier material for attachment to (and subsequent removal of) the non-iron based particulates. Use of a magnetic carrier permits consistent high efficiency ink removal in waste papers containing xerographic and laser inks consisting of various levels of carbon-based and iron-based inks.

The understood mechanism by which the agglomerant functions is that even though both inks and magnetite particles are mutually hydrophobic and, therefore, mutually attractive, the resultant attractive forces are not strong enough to withstand the mechanical agitation in the repulper. The addition of the agglomerant serves to modify the surface chemistry of the system such that the presumably large hydrophobic tail of the agglomerant migrates and attaches itself to the surface of each hydrophobic particle (ink and magnetite) in the system. The resultant increase in attractive forces between particles promotes agglomeration. Also, the ink particles become soft and tacky at temperatures above 60° C. which contributes to agglomeration. Then, on lowering the temperature to below 60° C., and preferably below 50° C., by pulp dilution, the formed agglomerates become hard and rigid; and as they contain some magnetic field susceptible material, they can be removed effectively by magnetic separation.

Possible polymers useful in the invention deinking process include polymers and copolymers of: (1) styrene or substituted styrenes, such as α-methylstyrene or vinyltoluene; (2) esters of acrylic or methacrylic acid of the form $CH_2=CHRCOOR'$, where R is hydrogen or methyl and R' is a $C_1$ to $C_{18}$ alkyl group, such as methyl methacrylate, butyl methacrylate, isodecyl methacrylate, butyl acrylate, and 2-ethyl hexylacrylate; and (3) hydroxyesters of (2) above where R' is —R"OH, where R" is a $C_2$ to $C_4$ alkylene group, such as hydroxyethyl acrylate, hydroxypropyl acrylate, hdroxyethyl methacrylate, and hydroxypropyl methacrylate, where the polymer/copolymer has a Ring and Ball softening point from 70° to 105° C., preferably from 70° to 95° C. and a weight average molecular weight from 1,000 to 10,000, preferably from 2,000 to 8,000. The preferred copolymers for use in the invention process are styrene/hydoxyethyl methacrylate and styrene 2-ethyl hexylacrylate.

The following examples describe such treatment, as well as studies of selected variables, such as temperature, pH, and consistency, and provide an evaluation of the combination of flotation and magnetic deinking. These examples are provided for purposes of illustration and are not to be construed as limiting the invention.

EXAMPLE 1

Recovered nonimpact printed white ledger paper was repulped (at 10% consistency and 50° C. for 15 minutes) in a Lamort laboratory hydrapulper using a helical rotor. The resulting pulp was homogenized in a Hobart Mixer and then evaluated for moisture content. This pulp was used in a series of experiments to determine the benefits of substituting an 80/20 styrene/hydroxyethyl methacrylate (SHEMA) for agglomerant additive in a magnetic deinking process.

Constant charges of 0.8% caustic and 0.05% magnetite were added to 100 gm oven-dried (OD) repulped furnish at 6% consistency along with variable charges of an agglomerant (Betz Paperchem's CDI-230 was used in this example) and SHEMA. The resulting pulp slurry was heated in a microwave oven to 75° C.–77° C. After treatment of the slurry and additives in a British Disintegrator, a pulp slurry corresponding to 6 gm OD pulp was withdrawn and diluted to 0.3% consistency for subsequent magnetic separation of ink from fiber. Deinking was performed by suspending a permanent magnet into the vortex of a constantly stirred slurry (at ambient temperature for 10 minutes). The deinked pulp was made into TAPPI brightness sheets for ink analysis. Ink analysis was performed on an Optomax V Image Analyzer. The results are shown in Table I.

TABLE I

| Run # | Agglomerant % | Magnetite % | SHEMA[1] % | SHEMAG[2] % | Total Ink[3] ppm (feed = 3000) | TAPPI Ink[4] ppm (feed = 2750) | Ink Removal[5] % |
|---|---|---|---|---|---|---|---|
| 1 | 0 | 0 | — | — | 870 | 850 | 71.0 |
| 2 | 1 | 0 | — | — | 67 | 20 | 92.3 |
| 3 | 1 | 0.05 | — | — | 2 | 0 | >99.9 |
| 4 | 0.5 | 0.05 | — | — | 5 | 3 | 99.8 |
| S | 0.25 | 0.05 | — | — | 15 | 11 | 99.5 |
| 6 | 0.1 | 0.05 | — | — | 40 | 32 | 98.7 |
| 7 | 0.25 | 0.05 | 0.5 | — | 1 | 0 | >99.9 |
| 8 | 0.15 | 0.05 | 0.5 | — | 3 | 2 | 99.9 |
| 9 | 0.1 | 0.05 | 0.5 | — | 4 | 1 | 99.9 |
| 10 | 0.25 | 0.05 | 0.1 | — | 3 | 0 | 99.9 |
| 11 | 0.15 | 0.05 | 0.1 | — | 46 | 21 | 98.5 |
| 12 | 0.1 | 0.05 | 0.1 | — | 39 | 24 | 98.7 |
| 13 | 0.15 | 0.05 | 0.25 | — | 12 | 5 | 99.6 |
| 14 | 0.25 | — | — | 0.15 | 5 | 4 | 99.8 |

[1]SHEMA (80/20 styrene/hydroxyethyl methacrylate copolymer)
[2]SHEMAG-50, a 50/50 mixture of SHEMA and magnetite
[3]Total Ink, area of ink particles >80 microns in diameter
[4]TAPPI Ink, area of ink particles >220 microns in diameter
[5]Percent ink removal based on the total ink content in the feed Comparison of runs 1 and 2 (no chemical pretreatment (1) and no magnetite on (2) prior to magnetic deinking) and runs 3–6 (pretreatment with agglomerant and magnetite) exhibit the necessity for pretreatment before magnetic deinking. A total ink content of less than 20 ppm or TAPPI content of less than 5 ppm is currently considered acceptable for high-quality papers. Thus, at 0.05% magnetite addition, at least 0.50% agglomerant is required for acceptable (TAPPI) pulp.

The additional data evidence that the use of SHEMA as seed material in the chemical pretreatment at 0.5% addition level allowed for a reduction of agglomerant charge from 0.25% to 0.10% without any negative impact on ink removal. The total ink contents at agglomerant levels of 0.25%, 0.15%, and 0.1% were 1 ppm, 3 ppm, and 4 ppm, respectively (runs 7, 8, and 9). For comparison, the final visible ink content after deinking at 0.1% agglomerant without the SHEMA addition was 40 ppm (run 6).

When the SHEMA charge was reduced to 0.1% at agglomerant charges of 0.25%, 0.15%, and 0.1%, only at 0.25% agglomerant was acceptable paper produced (run 10 vs. runs 11 and 12). Additionally, when 0.25% SHEMA charge was attempted in combination with 0.15% agglomerant, acceptable deinking was achieved (run 12).

EXAMPLE 2

In another set of experiments, SHEMA was mixed with magnetite in the ratio of 1:1 to determine whether an effective single, two-component system could be obtained. The SHEMA and magnetite mixture was prepared by heating the SHEMA above its melting point, and the resulting mixture was cooled and ground to a powder. The pretreatment/magnetic deinking conducted with the SHEMA/magnetite blend provided similar removal as compared to when SHEMA and magnetite were added separately (compare run 14 with run 10 in Table I).

EXAMPLE 3

An experiment similar to Examples 1 and 2 were conducted wherein SHEMA was substituted for by 94/6 styrene/2-ethyl hexylacrylate (SEHA). Again pulp from waste papers containing 100% non-magnetic inks was prepared as in Example 1. And a constant charge of 0.5% caustic was added to 100 gm of the OD repulped furnish at 6% consistency along with variable charges of magnetite, agglomerant, and SEHA. The resulting pulp slurry was treated as that in Example 1. The magnetically deinked pulp was made into TAPPI brightness sheets for ink analysis. The results are shown in Table II.

TABLE II

| Run # | Agglomerant (%) | SEHA[6] (%) | Magnetite (%) | Ink Removal[7] (%) |
|---|---|---|---|---|
| 15 | 1.0 | 0.07 | 0.03 | 99.9 |
| 16 | 0.75 | 0.07 | 0.03 | 99.7 |
| 17 | 0.5 | 0.1 | 0.05 | 96.9 |
| 18 | 1.0 | 0 | 0 | 0 |

[6]SEHA (94/6 styrene/2-ethyl hexylacrylate copolymer)
[7]Percent ink removal based on the total ink content in the feed The date in Table II show the effectiveness of the process using SEHA. Note that in run 18 where only the agglomeration chemical was used in the absence of magetite and SEHA, little or no ink removal was observed after magnetic separation. For comparison, run 15 and 16 with agglomerant in combination with SEHA and magnetite gave nearly complete ink removal.

Examples of placements within the deinking process of the magnetic removal step are shown in the drawings.

FIG. 1 shows the application of the invention method by applying a magnetic flux source (i.e., magnet) immediately external to a conventional conical forward cleaner, such that the flux, or magnetic field, is effective internal to the cleaner. The magnetic flux will provide an additional force on the ink particles pulling them toward the wall of the cleaner body. This action pulls additional ink particles into the reject stream, improving deinking efficiency.

Figure 2:
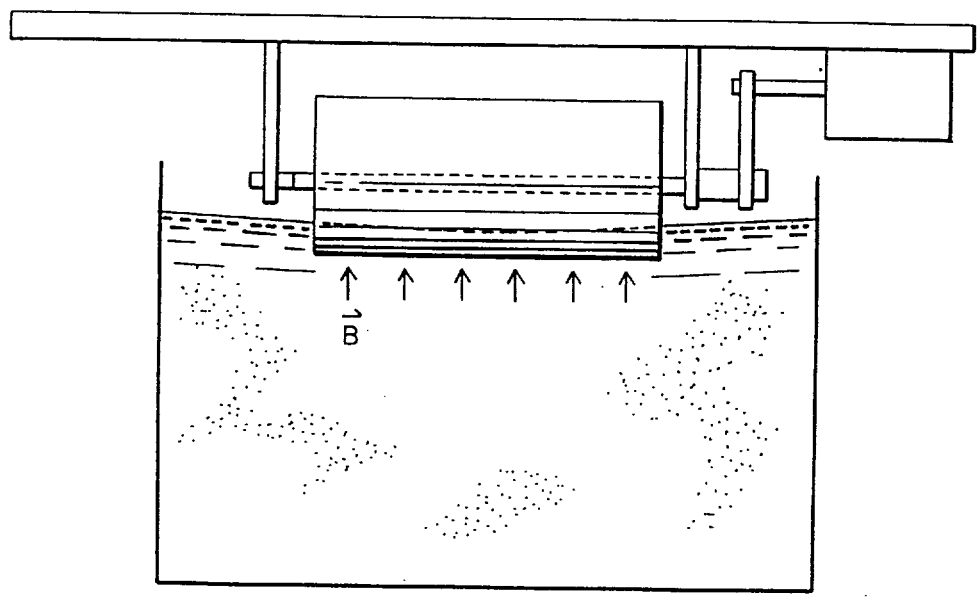
FIG. 2 is a cross-section depiction of the application of a magnetic field in a tank containing waste paper pulp slurry via a magnetic rotating drum partially submerged in said tank.

FIGS. 2 and 3, respectively, show a magnetic rotating drum or disk filter arrangement employed to attract magnetically susceptible ink particles from the upper portion of a tank of waste paper slurry. This approach would be appropriate any time after the ink is detached from the fiber. The magnetic ink removal equipment should be positioned to remove the ink which tends to concentrate in the vortex area of a stirred tank.

FIG. 4 shows a holding tank configured with a magnetic rotating drum situated in a weir. All stock must pass though the narrow channel in which the drum is positioned. The ink becomes attached to the surface of the drum as it rotates through the slurry and is detached and removed outside the slurry.

As will be appreciated by those skilled in the art, the present invention may be embodied in other specific forms without departing from the spirit or essential attributes thereof, and, accordingly, reference should be made to the appended claims, rather than to the foregoing specification, as indicating the scope of the invention.

What is claimed is:

1. An improved process for deinking non-impact printed waste paper contaminated with xerographic and laser inks comprising forming a fiber slurry by repulping the waste paper, pretreating the slurry with an agglomeration agent and magnetite, followed by magnetic deinking by subjecting the pretreated slurry to a magnetic field to separate out from the pretreated slurry the xerographic and laser inks, wherein the improvement comprises replacement of a portion of the agglomeration agent in the slurry pretreatment step with a polymer selected from the group of copolymers of styrene and hydroxyesters of esters of acrylic and methacrylic acid of the form $CH_2$=CHRCOOR' where R= is —R"OH, where R" is a $C_2$ to $C_4$ alkylene group, and where the polymer has a Ring and Ball softening point from 70° to 105° C. and a weight average molecular weight from 1,000 to 10,000.

2. The improved process of claim 1 wherein the polymer softening point is 70°–95° C. and the weight average molecular weight is from 2,000 to 8,000.

3. The improved process of claim 2 wherein the polymer is 80/20 styrene/hydroxyethyl methacrylate.

4. The improved process of claim 1 wherein the magnetic treatment is conducted at ambient or higher temperatures, at pulp consistencies up to 4.0%, and at neutral to alkaline pH.

5. The improved process of claim 4 wherein the magnetic treatment is conducted at from about 25° to 75° C., at a pH of from about 7.0 to about 11.0, and at a consistency of from about 0.3 to 2.0%.

6. The improved process of claim 5 wherein the process includes employment of a conical forward cleaner and employs in conjunction with the forward cleaner in the form of a magnetic flux source positioned immediately external to the forward cleaner.

7. The improved process of claim 1 further comprising an additional treatment step selected from the group consisting of screening, flotation, centrifugal cleaning, washing and sedimentation/decantation, or a combination thereof.

8. The improved process of claim 7 wherein the additional treatment step is flotation.

9. The improved process of claim 8 wherein the pulp is subjected to the magnetic separation prior to the additional treatment step.

* * * * *